Figure 1:
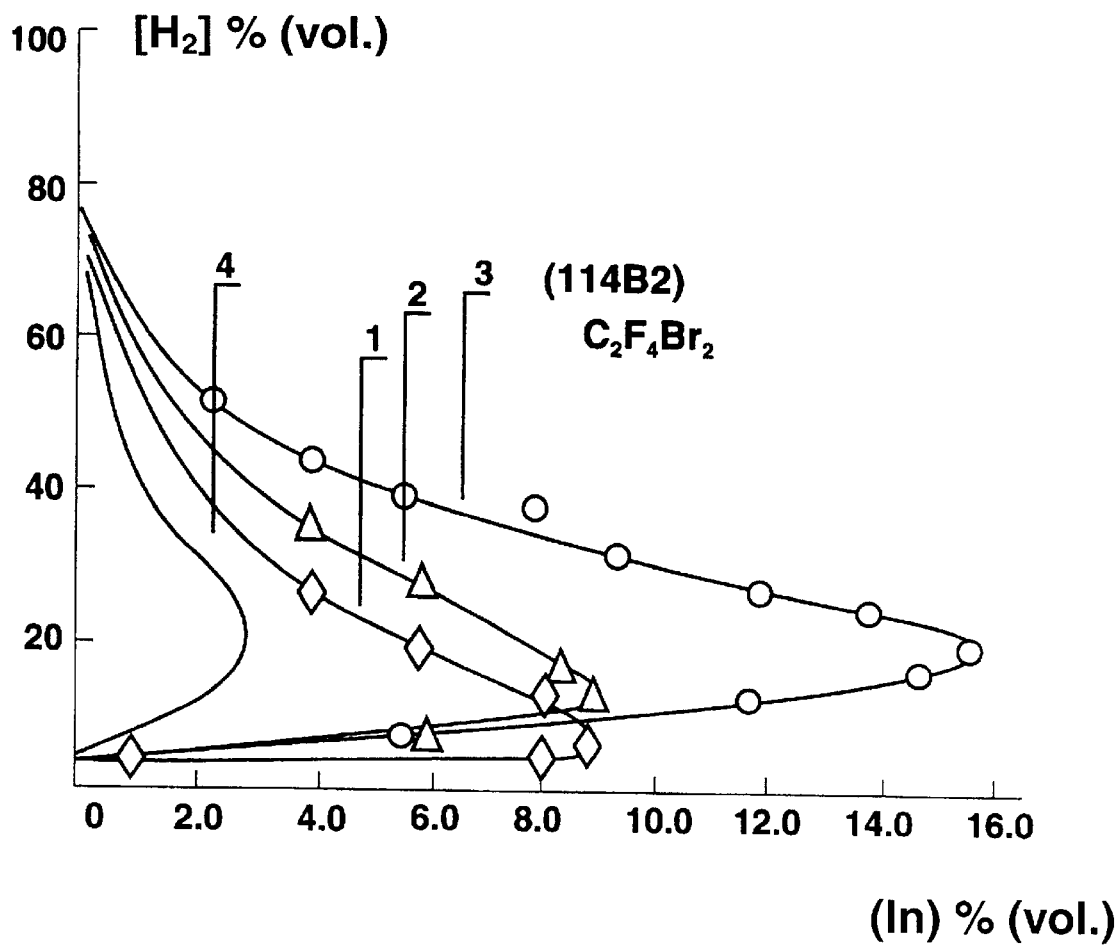

United States Patent [19]
Azatyan et al.

[11] Patent Number: 6,099,294
[45] Date of Patent: Aug. 8, 2000

[54] METHOD OF REGULATING THE OXIDATION OF HYDROGEN IN AIR, INCLUDING THE TRANSITION TO COMBUSTION, THE INTENSITY OF COMBUSTION, THE TRANSITION FROM COMBUSTION TO EXPLOSION AND THE INTENSITY OF EXPLOSION

[76] Inventors: Vylen Vagarshovich Azatyan, Ap. 39, b1, 18, Shkolny blv., Charnogolovka, Moginsky district of Moscow Region, Russian Federation, 142432; Alexandr Grigoryevich Merzhanov, APT 2, BL. 3, Street 3, Charnogolova, Noginak district of Moscow Region, Russian Federation; Rafik Grantovich Aivazyan, Ap. 194 Bl. 16, Skolny Blv.; Vladimir Ivanovich Kalachyov, Ap. 78 Bl. 1 Centralnaya ul., both of Chernogolovka, Nogiusk district of Moscow Region, Russian Federation, 142432

[21] Appl. No.: 08/680,639

[22] Filed: Jul. 17, 1996

[51] Int. Cl.$^7$ .................................. C10J 1/02; F23J 7/00
[52] U.S. Cl. .................................. 431/4; 44/603; 252/372
[58] Field of Search .................................. 252/372; 431/4; 44/603

[56] References Cited

U.S. PATENT DOCUMENTS

| | | | |
|---|---|---|---|
| 2,679,542 | 5/1954 | Dorsey | 252/372 |
| 2,679,544 | 5/1954 | Bills | 252/372 |
| 4,643,666 | 2/1987 | Green et al. | 431/4 |

FOREIGN PATENT DOCUMENTS

| | | |
|---|---|---|
| 58-213092 | 12/1983 | Japan . |
| 1835139A3 | 10/1992 | Russian Federation . |
| 2015380 | 6/1994 | Russian Federation . |
| 2028369 | 9/1995 | Russian Federation . |
| 2125818 | 3/1984 | United Kingdom . |

Primary Examiner—Wayne Langel
Attorney, Agent, or Firm—J. Michael Martinez de Andino; McGuire, Woods, Battle & Boothe LLP

[57] ABSTRACT

According to the present invention, the ignition, combustion and explosion of hydrogen-air mixtures are dependent primarily on the presence of active intermediates (free atomic hydrogen, atomic oxygen and hydroxyl radicals) that serve as chain carriers and enable the propagation of reaction chains. These active intermediates rather than thermal energy are of primary importance to the oxidation process. The proposed inhibitor molecules capture these active intermediates. This capturing in turn suppresses the reaction chains. As a result, the oxidation of hydrogen in air, including the transition to combustion, the intensity of combustion, the transition from combustion to explosion and the intensity of explosion vary inversely with the inhibitor content. Even when the amount of inhibitor is too small to prevent ignition, a greater ignition source is needed and the intensity of combustion is reduced. The transition from combustion to explosion is also made more difficult or prevented. Moreover, the intensity of explosion, if it occurs, will be decreased. Consequently, the choice of inhibitor and control of its concentration in a hydrogen-air mixture provides for a method of regulating (1) the transition to combustion, (2) the intensity of combustion, (3) the transition from combustion to explosion and (4) the intensity of explosion. The proposed inhibitors include saturated or unsaturated hydrocarbons with one to eight carbon atoms that have a normal structure, an isostructure or a cyclical structure, including aromatics, and mixtures of such hydrocarbons.

20 Claims, 1 Drawing Sheet

METHOD OF REGULATING THE OXIDATION OF HYDROGEN IN AIR, INCLUDING THE TRANSITION TO COMBUSTION, THE INTENSITY OF COMBUSTION, THE TRANSITION FROM COMBUSTION TO EXPLOSION AND THE INTENSITY OF EXPLOSION

The present invention relates to a method for regulating the oxidation of hydrogen in air, including the transition to combustion, the intensity of combustion, the transition from combustion to explosion and the intensity of explosion through the use of environmentally safe, inexpensive and efficient inhibitors. Such regulation facilitates the storage and transportation of hydrogen, enhances production processes in which hydrogen is present or is formed and enhances the use of hydrogen as a fuel. The present invention is based in part on the still pending Russian Federation patent application serial number 94017124/26 017429 that was filed on May 16, 1994.

There are methods for extinguishing fires in closed spaces through the utilization of gaseous inert diluents ($CO_2$ and $N_2$). *Fire Safety, Explosion Safety* 134–37 (1987). Closed space fire suppression is based on creation, in a protected space, of a medium which does not support fire. The closed fire suppression method is one of the most effective methods of protection of premises from fires. However, unlike inhibitors, gaseous inert diluents which are sometimes used for closed space fire suppression are extremely ineffective, especially when used for preventing the ignition and explosion of mixtures of hydrogen with air, because they do not have inhibiting properties and are not very efficient.

There is a known method of preventing the ignition and explosion of hydrogen-air mixtures in which halons are used as gas phase inhibitors. However, halons (and the products of their oxidation) are chemically aggressive toward many materials, including metals (corrosion), wood, rubber and polyethylene, are extremely poisonous and damage the ozone layer of the atmosphere. Further, large quantities (especially in terms of weight) of the halons are needed to prevent the ignition and explosion of hydrogen-air mixtures because such inhibitors have low inhibiting capability and high molecular mass.

Russian patent number 2042366, "Inhibitor for Suppression of Ignition and Explosion of Hydrogen-Air Mixtures", issued Aug. 27, 1995 to the present inventors, discloses that certain hydrocarbons having one to six carbon atoms will at high enough concentrations prevent the ignition and explosion of hydrogen-air mixtures. However, this patent is limited to the use of only two classes of simple hydrocarbons, alkanes and alkenes, with the additional limitation of no more than six carbon atoms in the molecule. It does not reveal the mechanism by which wide classes of hydrocarbons can be used as inhibitors to regulate the oxidation of hydrogen in air, including the transition to combustion, the intensity of combustion, the transition from combustion to explosion and the intensity of explosion.

Russian patent number 1835139 A3, "Method for Fueling an Internal Combustion Gas Engine", issued Oct. 13, 1992 to one of the present inventors and others, discloses a fueling technique in which hydrogen is mixed with an unsaturated low molecule hydrocarbon, such as propylene ($C_3H_6$), so that the fuel mixture is 2% to 27% hydrocarbon in volume. This fuel mixture is injected into a combustion cylinder under pressure of 0.45 to 1.2 mpa so that the duel-air mixture in the cylinder is 0.25–3.5% fuel in mass. This patent is limited to a narrow application in which a type of low molecular hydrocarbon, known itself to be a fuel, is used as a fuel supplement to hydrogen rather than as an inhibitor. It does not reveal the mechanism by which wide classes of hydrocarbons can be used as inhibitors to regulate the characteristics of ignition, combustion and explosion of any hydrogen-air mixture.

Russian patent number 2015380, "Method of Operation of a Gas Turbine Unit", issued Jun. 30, 1994 to one of the present inventors and others, discloses a fueling technique in which hydrogen is mixed with an unsaturated hydrocarbon containing two to four carbon atoms so that the fuel mixture is 2% to 27% hydrocarbon in volume. This fuel mixture is compressed with air and is injected into a combustion chamber which produces expanded combustion products that transfer their energy to a gas turbine. This patent is limited to a narrow application in which a type of low molecular hydrocarbon, known itself to be a fuel, is used as a fuel supplement to hydrogen rather than as an inhibitor. It does not reveal the mechanism by which wide classes of hydrocarbons can be used as inhibitors to regulate the characteristics of ignition, combustion and explosion of any hydrogen-air mixture.

Russian patent number 2028369, "Fuel for Power Units", issued Feb. 9, 1995 to two of the present inventors and two others, discloses a fueling technique in which hydrogen is mixed with an unsaturated hydrocarbon containing one to four carbon atoms so that the fuel mixture is 2% to 27% hydrocarbon in volume with 1% or less of air. This patent is limited to a narrow application in which a type of low molecular hydrocarbon, known itself to be a fuel, is used as a fuel supplement to hydrogen. It does not reveal the mechanism by which wide classes of hydrocarbons can be used as inhibitors to regulate the characteristics of ignition, combustion and explosion of any hydrogen-air mixture.

The present invention discloses, contrary to prevailing views, that the dominant factor in determining and controlling the features of ignition, combustion and explosion of hydrogen in air, not only a very low pressures (tens of times lower than atmospheric pressure) but even at atmospheric and higher pressures, is not the creation of thermal energy but the propagation of reaction chains through chain branching and chain continuation. Moreover, the present invention discloses that the branching chain mechanism plays a primary role not only in the induction period but also in the development of combustion. In addition, explosion itself is shown to be caused just as importantly by reaction chain branching as by self heating. The present invention further discloses that wide classes of hydrocarbons, because of their effectiveness in suppressing reaction chains, may be used as active inhibitors to regulate the oxidation of hydrogen in air, including the transition to combustion, the intensity of combustion, the transition from combustion to explosion and the intensity of explosion.

In order to overcome the disadvantages in the previously known methods for preventing the ignition and explosion of mixtures of hydrogen and air, and in previously known methods which relate to fueling techniques, there is a need for a method of regulating the oxidation of hydrogen in air which will be efficient, environmentally safe, non-corrosive and non-toxic. There is also a need for such a method which will facilitate the storage and transportation of hydrogen, enhance production processes in which hydrogen is present or formed and enhance the use of hydrogen as a fuel. The method of the present invention meeting these requirements is described in the following summary.

According to the present invention, the ignition, combustion and explosion of hydrogen-air mixtures are dependent primarily on the presence of active intermediates (free atomic hydrogen, atomic oxygen and hydroxyl radicals) that serve as chain carriers and enable the propagation of reaction chains. These active intermediates rather than thermal energy are of primary importance to the oxidation process. The present invention discloses that certain hydrocarbon inhibitors capture these active intermediates. This capturing in turn suppresses the reaction chains. As a result, the oxidation of hydrogen in air, including the transition to combustion, the intensity of combustion, the transition from combustion to explosion and the intensity of explosion vary inversely with the inhibitor content. Even when the amount of inhibitor is too small to prevent ignition, it will nevertheless reduce the intensity of combustion and make more difficult or prevent the transition from combustion to explosion. Moreover, the intensity of explosion, if it occurs, will be decreased. Consequently, the choice of inhibitor and control of its concentration in hydrogen-air mixtures permits the regulation of (1) the transition to combustion, (2) the intensity of combustion, (3) the transition from combustion to explosion and (4) the intensity of explosion.

Saturated or unsaturated hydrocarbons with one to eight carbon atoms that have a normal structure, an isostructure or a cyclical structure, including aromatics, and mixtures of such hydrocarbons will work well as inhibitors because they efficiently capture the active intermediates. These hydrocarbons and their mixtures are non-corrosive, non-toxic, environmentally safe and inexpensive. They are readily obtained from natural gas and from the processes of petroleum creaking, reforming and coal distillation.

Hydrocarbons with more than eight carbon atoms are not advisable under normal conditions because at such temperatures the pressure of the saturated vapors of these hydrocarbons is rather low and they cannot be part of a gas phase inhibitor. At higher temperatures these heavier hydrocarbons may be used. Halons, however, are not advisable because they are inefficient at capturing active intermediates, chemically aggressive, toxic, environmentally harmful and expensive.

Accordingly, it is the primary object of the present invention to provide a method for regulating the oxidation of hydrogen in air, including the transition to combustion, the intensity of combustion, the transition from combustion to explosion and the intensity of explosion through the use of environmentally safe and efficient inhibitors that capture the active intermediates in the oxidation process.

It is a further object of this invention to provide such a method that includes an inhibitor consisting of a saturated or unsaturated hydrocarbon containing one to eight atoms of carbon having a normal structure, an isostructure or a cyclical structure, including aromatics, or a mixture of such hydrocarbons. Other objects and advantages of this invention will become apparent from the following description wherein is set forth, by way of illustration and example, certain embodiments of this invention.

FIG. 1 shows the limits of the area of ignitability of hydrogen-air mixtures resulting from additions of various amounts of hydrocarbon inhibitors and the most effective of the known halogen inhibitors. It also shows the limits of the area of explosion of hydrogen-air mixtures in the presence of small amounts of a proposed hydrocarbon inhibitor.

Before the present invention is described, it is to be understood that this invention is not limited to a particular or specific description. It is also to be understood that the terminology used herein is for the purpose of describing particular embodiments only, and is not intended to be limiting, as the scope of the present invention will be limited only by the appended claims. Further, unless defined otherwise, all terms used herein have the same meaning as commonly understood by one of ordinary skill in the art to which this invention belongs.

In discovering the present invention of providing a method for regulating the oxidation of hydrogen in air, the inventors learned that the proposed hydrocarbon inhibitors efficiently capture the active intermediates in the oxidation process.

The oxidation of hydrogen involves a cycle of reaction chains that repeats itself and multiplies. The chain cycle contains the following reactions:

$$H+O_2 \rightarrow OH+O \quad (1)$$

$$O+H_2 \rightarrow OH+H \quad (2)$$

$$OH+H_2 \rightarrow H_2O+H \quad (3)$$

$$OH+H_2 \rightarrow H_2O+H \quad (4)$$

$$H+3H_2+O_2 \rightarrow 2H_2O+3H$$

Each of these reactions is caused by an active intermediate. The first is caused by a free atomic hydrogen (H). The second is caused by a free atomic oxygen (O) formed in the first reaction. The third and fourth are caused by free hydroxyl radicals (OH) formed in the first and second reaction. These active intermediates are important because they easily react with the far more abundant and stable molecules of oxygen ($O_2$) and hydrogen ($H_2$).

The four reactions constitute a cycle that is initiated by a single free hydrogen (H). At the end of the cycle, there are three free hydrogens (3H) which begin three new cycles, that is, three new branches. This results in a geometric progression of the number of active intermediates and reaction chain branches: 1>3>9>27>. . .

Because the free hydrogen atoms are very active in their reaction to $O_2$, the rate of $O_2$ consumption and the rate of the process as a whole progressively increase as long as the rate of chain branching is greater than that of chain termination. The result is ignition, combustion and explosion.

The multiplication of active intermediates may be interrupted if they recombine or react with certain kinds of molecules. If the appropriate inhibitors are present this is precisely what happens. The active intermediates interact with the inhibitor molecules and the reaction chains are terminated. If the number of terminations during a given time interval is greater than the number of chain branchings, no progressive multiplication of the active intermediates takes place and no ignition, combustion or explosion can occur.

The present invention is directed toward capturing the active intermediates and is implemented using the following steps. An inhibitor can be (1) injected into the hydrogen or into the air before the formation of the mixture of the hydrogen with the air, (2) injected into a vacuum before the admission of the hydrogen or the air, or (3) injected directly into the hydrogen-air gas mixture. At least one hydrocarbon, saturated or unsaturated, having a molecular structure of one to eight carbon atoms and hving a normal structure, an isostructure or a cyclical structure, including aromatics, or a mixture of such hydrocarbons containing any number of components can be used as the inhibitor. The desired concentration of such hydrocarbon inhibitor is then controlled within the range of 0.1% to 15.5% of the total gas mixture volume.

The present inventors have found that when the inhibitor concentration is too small to prevent ignition, the resulting combustion is much weaker than when ignition occurs in the absence of the inhibitor. This is revealed by significantly smaller pressure jumps at ignition and by smaller degrees of consumption of hydrogen. It was also found that a greater ignition source was needed in such cases. Similarly, as shown in FIG. 1, an inhibitor prevents hydrogen-air mixtures from making the transition from combustion to explosion. This effect is caused by the inhibitor's capture of active intermediates so that the reaction chains are significantly suppressed. As shown in FIG. 1, a concentration of 1.2% of a proposed hydrocarbon inhibitor prevents the transition from combustion to explosion of a 40% hydrogen and 60% air gas mixture.

These results indicate two different critical inhibitor concentrations: that sufficient to prevent ignition (C1), and that sufficient to prevent the transition to an explosion (C2). When the inhibitor concentration is below C2, the inhibitor will not prevent either the ignition or the explosion of the hydrogen-air mixture, but it will diminish the power of the explosion. For example, with a proposed hydrocarbon inhibitor content of at least 0.1%, the power of the explosion of a 40% hydrogen and 60% air gas mixture was observed to be reduced by more than 3.5%. This reduction, even though small, was greater than the scattering of measurement results. At a 0.5% presence of a proposed hydrocarbon inhibitor, the power of the explosion was observed to be reduced by 25%.

As shown on FIG. 1, when measured by volume, the proposed hydrocarbon inhibitors have 1.6 times greater inhibiting capability than the previously known halons. In FIG. 1, reference numeral 1 indicates the limits of the area of ignitability in the presence of $C_6H_{12}$. Reference numeral 2 indicates the limits of the area of ignitability in the presence of $C_3H_4$. Reference numeral 3 indicates the limits of the area of ignitability in the presence of the most effective halon (halon 114B2). Reference numeral 4 indicates the limits of the area of explosion in the presence of $C_3H_6$.

When measure by weight, the advantage of the proposed hydrocarbon inhibitors is more than six times greater than the most effective halon 114B2. This is because the molecular mass of halons is approximately four times greater than the molecular mass of the proposed hydrocarbons.

The following Tables 1–5 summarize numerous tests utilizing the effects of the proposed light hydrocarbon inhibitors on the regulation of the intensity of combustion, the transition from combustion to explosion and the intensity of explosion of hydrogen-air mixtures. The tables set forth the concentration levels of the proposed inhibitors, the hydrogen and the air, as well as indicate the combustibility of the hydrogen-air mixture.

TABLE 1

Test with $C_2H_6$ as the Inhibitor

Table 1 illustrates several tests of combustion and explosion of hydrogen-air mixtures in the presence of $C_2H_6$ as the inhibitor. As the concentration of $C_2H_4$ increases from 2% to 6% to 8%, greater proportions of air are needed for combustion to occur. Because the inhibitor molecules at higher concentrations capture more active intermediates, there must be a greater abundance of oxygen molecules for the surviving free hydrogen atoms to sustain the oxidation process. Even when combustion occurs in the presence of the inhibitor, the relatively low pressure jumps at ignition and small consumption of hydrogen demonstrate that the intensity of combustion has been reduced.

TABLE 2

Tests with 50% $C_8H_{18}$ (an Octane) and 50% $C_3H_6$ (Propylene)

Table 2 demonstrates several tests of the combustion and explosion of hydrogen-air mixtures in the presence of an inhibitor consisting of 50% $C_8H_{18}$ (an octane) and 50% $C_3H_6$ (propylene). As the inhibitor concentration increases from 2% to 4%, greater proportions of air are needed for combustion to occur. Because the inhibitor molecules at higher concentrations capture more active intermediates, there must be a greater abundance of oxygen molecules for the surviving free hydrogen atoms to sustain the oxidation process. Even when combustion occurs in the presence of the inhibitor, the relatively low pressure jumps at ignition and small consumption of hydrogen demonstrate that the intensity of combustion has been reduced.

TABLE 3

Tests with 50% $C_2H_6$+25% $C_4H_8$+25% $C_7H_{16}$

Table 3 demonstrates several tests of the combustion and explosion of hydrogen-air mixtures in the presence of an inhibitor consisting of 50% $C_2H_6$+25% $C_4H_8$+25% $C_7H_{16}$. As the concentration of the inhibitor increases from 2% to 6%, greater proportions of air are needed for combustion to occur and the intensity of combustion is reduced.

TABLE 4

Tests with 20% $C_3H_8$+37% $C_4H_{10}$+19% $C_3H_6$+ 20% $C_4H_8$+4% cyclic $C_6H_5CH_3$ Table 4 demonstrates several tests of the combustion and explosion of hydrogen-air mixtures in the presence of an inhibitor consisting of 20% $C_3H_8$+37% $C_4H_{10}$+19% $C_3H_6$+ 20% $C_4H_8$+4% cyclic $C_6H_5CH_3$. As the concentration of the inhibitor increases from 2% to 6%, greater proportions of air are needed for combustion to occur and the intensity of combustion is reduced. When the inhibitor content is 9% or more, the mixtures become inflammable.

TABLE 5

Tests with 50% $C_8H_{18}$+50% $C_3H_8$

Table 5 demonstrates several tests of the combustion and explosion of hydrogen-air mixtures in the presence of an inhibitor consisting of 50% $C_8H_{18}$+50% $C_3H_8$. As the concentration of the inhibitor increases from 2% to 4%, greater proportions of air are needed for combustion to occur and the intensity of combustion is reduced.

TABLE 1

First Inhibitor Mixture ($C_3H_4$)

| Component content percent of total volume | | | Ignition | Concentration limits, upper | pressure jump as % of same in absence | hydrogen consumption as % of same in |
| --- | --- | --- | --- | --- | --- | --- |
| $H_2$ | Air | Inhibitor | + or − | and lower | of inhibitor | absence of inhibitor |
| 1 | 2 | 3 | 4 | 5 | 6 | 7 |
| 54.0 | 44.0 | 2.0 | − | 49% (Upper) | | |
| 52.0 | 46.0 | 2.0 | − | | | |
| 48.0 | 50.0 | 2.0 | + | | 60 | 70 |
| 48.0 | 52.0 | 2.0 | + | | 65 | 70 |
| 41.0 | 53.0 | 6.0 | − | | | |
| 38.0 | 55.0 | 6.0 | − | 37% (Upper) | | |
| 36.0 | 58.0 | 6.0 | + | | 25 | 50 |
| 33.0 | 59.0 | 8.0 | − | | | |
| 29.0 | 62.0 | 8.0 | + | | 20 | 40 |
| 32.0 | 60.0 | 8.0 | − | 30% (Upper) | | |

TABLE 2

Second Inhibitor Mixture of 50% $C_8H_{10}$ (Octanes) + 50% $C_3H_6$ (Propylene)

| Component content percent of total volume | | | Ignition | Concentration limits, upper | pressure jump as % of same in absence | hydrogen consumption as % of same in |
| --- | --- | --- | --- | --- | --- | --- |
| $H_2$ | Air | Inhibitor | + or − | and lower | of inhibitor | absence of inhibitor |
| 1 | 2 | 3 | 4 | 5 | 6 | 7 |
| 43.0 | 55.0 | 2.0 | − | | | |
| 42.0 | 56.0 | 2.0 | — | 41% (Upper) | | |
| 40.0 | 58.0 | 2.0 | + | | 20 | 50 |
| 32.0 | 62.0 | 4.0 | − | | | |
| 28.0 | 66.0 | 4.0 | + | 29.5% (Upper) | 20 | 40 |
| 31.0 | 63.0 | 4.0 | − | | | |

TABLE 3

Third Inhibitor Mixture of 50% $C_2H_6$ + 25% $C_4H_8$ + 25% $C_7H_{14}$

| Component Contents percent of total volume | | | Ignition: + or − | Concentration Limits, upper and lower | pressure jump as % of same in absence of inhibitor | hydrogen consumption as % of same in absence of inhibitor |
|---|---|---|---|---|---|---|
| $H_2$ 1 | Air 2 | Inhibitor 3 | 4 | 5 | 6 | 7 |
| 50.0 | 48.0 | 2.0 | − | 48% (Upper) | | |
| 48.0 | 50.0 | 2.0 | − | 48% | | |
| 46.0 | 52.0 | 2.0 | + | 48% | 60 | 70 |
| 32.0 | 64.0 | 4.0 | − | 30% (Upper) | | |
| 28.0 | 68.0 | 4.0 | + | 30% | 25–30 | 40 |
| 27.0 | 69.0 | 4.0 | + | 30% | 25–30 | 40 |
| 26.0 | 68.0 | 6.0 | − | 21.5% (Upper) | | |
| 22.0 | 72.0 | 6.0 | − | 21.5% | | |
| 21.0 | 73.0 | 6.0 | + | 21.5% | 20 | 30 |

TABLE 4

Fourth Inhibitor Mixture of 20% $C_3H_8$ + 37% $C_4H_{10}$ + 19% $C_3H_8$ + 20% $C_4H_8$ + 4% cyclic $C_4H_4CH_3$

| Component Contents, percent of total volume | | | Ignition: + or − | Concentration Limits, upper and lower | Explosion |
|---|---|---|---|---|---|
| $H_2$ 1 | Air 2 | Inhibitor 3 | 4 | 5 | 6 |
| 50.0 | 48.0 | 2.0 | − | 45% (Upper) | |
| 46.0 | 52.0 | 2.0 | − | | |
| 44.0 | 54.0 | 2.0 | + | | — |
| 42.0 | 56.0 | 2.0 | + | | very weak |
| 30.0 | 66.0 | 4.0 | − | 29% (Upper) | |
| 28.0 | 68.0 | 4.0 | + | | — |
| 20.0 | 74.0 | 8.0 | − | 18% (Upper) | |
| 19.0 | 75.0 | 6.0 | − | | |
| 17.0 | 77.0 | 6.0 | + | | — |
| 10.0 | 84.0 | 6.0 | + | 8% | — |
| 5.0 | 89.0 | 6.0 | − | (Lower) | |
| 20.0 | 71.0 | 9.0 | − | | When the content of this complex inhibitor is 9% or more, the mixture becomes inflammable |
| 10.0 | 81.0 | 9.0 | − | | |

TABLE 5

Fifth Inhibitor Mixture of 50% $C_8H_{18}$ + 50% $C_3H_8$

| Component Contents, percent of total volume | | | Ignition: + or − | Concentration Limits, upper and lower | pressure jump as % of same in absence of inhibitor | hydrogen consumption as % of same in absence of inhibitor |
|---|---|---|---|---|---|---|
| $H_2$ 1 | Air 2 | Inhibitor 3 | 4 | 5 | 6 | 7 |
| 43.0 | 55.0 | 2.0 | − | 41% (Upper) | | |
| 42.0 | 56.0 | 2.0 | − | | | |
| 40.0 | 58.0 | 2.0 | + | | 25 | 40 |
| 32.0 | 64.0 | 4.0 | − | 29.5% (Upper) | | |
| 31.0 | 65.0 | 4.0 | − | | | |
| 28.0 | 68.0 | 4.0 | + | | 20 | 25 |

SUMMARY OF TEST DATA

The test data reflected in the Tables and in FIG. 1 demonstrate that the proposed hydrocarbons can be used to regulate the oxidation of hydrogen in air, including the transition to combustion, the intensity of combustion, the transition from combustion to explosion and the intensity of explosion. The proposed hydrocarbons by capturing the active intermediates in the oxidation process provide for a method of such regulation. The test data also demonstrate that saturated or unsaturated hydrocarbons with one to eight carbon atoms and a normal structure, an isostructure or a cyclical structure, including aromatics, and mixtures of such hydrocarbons, can be used as inhibitors with great effectiveness.

POTENTIAL USES

The potential areas of use for the proposed inhibitors include but are not limited to:

1. In the receipt, storage, compression and transportation of hydrogen.

2. In the use of hydrogen as a fuel in power plants, internal combustion engines, gas turbine engines and furnaces.

3. In aircraft: probes, dirigibles, and balloons which use hydrogen as a lifting agent instead of helium. A small amount of inhibitor added to the hydrogen may render it practically fireproof. The lifting force of the hydrogen is decreased insignificantly by the inhibitor and is easily calculated by taking into account the molecular weight. This lifting force is still greater than that of helium.

4. In production connected with the formation of hydrogen as a primary and/or a bi-product. This includes electrolytic processes particularly in chlorine production.

5. In chemical production using hydrogen as a raw material: hydrogenation processes and other syntheses.

6. In equipment which uses hydrogen as a cooling gas because of its high temperature conductance. This equipment includes turbo generators cooled by gasified hydrogen especially at atomic power stations.

7. In atomic reactors when the content of hydrogen exceeds 12–14%.

8. In several biochemical processes which require the processes to be conducted in a hydrogen atmosphere.

9. In the pouring of liquid hydrogen.

It is to be understood that while certain forms of this invention have been illustrated and described, the invention is not limited thereto, except insofar as such limitations are included in the following claims.

What is claimed and described to be secured by Letters Patent is as follows:

1. A method of capturing in a mixture of hydrogen and air the active intermediates which serve as chain carriers in the oxidation of hydrogen, said method comprising the steps of:
   a. causing an inhibitor to be present in said mixture of hydrogen and air, said inhibitor consisting of at least one hydrocarbon wherein said hydrocarbon is a member selected from the group consisting of the hydrocarbons having a cyclical structure, including aromatic hydrocarbons;
   b. causing said mixture with said inhibitor to have an inhibitor concentration of up to about 15.5% of the total volume of said mixture with said inhibitor; and
   c. capturing said active intermediates by said inhibitor.

2. The method as set forth in claim 1 wherein said method includes the step of:
   a. regulating the transition to combustion of said mixture by varying said concentration of said inhibitor in said mixture.

3. The method as set forth in claim 1 wherein said method includes the step of:
   a. regulating the intensity of combustion of said mixture by varying said concentration of said inhibitor in said mixture.

4. The method as set forth in claim 1 wherein said method includes the step of:
   a. regulating the transition from combustion to explosion of said mixture by varying said concentration of said inhibitor is said mixture.

5. The method as set forth in claim 1 wherein said method includes the step of:
   a. regulating the intensity of explosion of said mixture by varying said concentration of said inhibitor in said mixture.

6. The method as set forth in claim 1 wherein said method includes the step of:
   a. using said hydrogen with said inhibitor as a fuel means.

7. The method as set forth in claim 1 wherein said method includes the step of:
   a. using said hydrogen with said inhibitor as a lifting means.

8. The method as set forth in claim 1 wherein said method includes the step of:
   a. using said hydrogen with said inhibitor as a cooling means.

9. The method as set forth in claim 1 wherein said method includes the step of:
   a. using said inhibitor as a component in a production process in which hydrogen is formed.

10. The method as set forth in claim 1 wherein said method includes the step of:
    a. using said inhibitor as a component in a production process in which hydrogen is present.

11. The method as set forth in claim 1 wherein said method includes the step of:
    a. receiving and storing, transporting, compressing or liquefying said hydrogen.

12. A method of capturing in a mixture of hydrogen and air the active intermediates which serve as chain carriers in the oxidation of hydrogen, said method comprising the steps of:
    a. causing an inhibitor to be present in said mixture of hydrogen and air, said inhibitor consisting of at least one hydrocarbon having three to eight carbon atoms wherein said hydrocarbon is a member selected from the group consisting of the hydrocarbons having a cyclical structure, including aromatic hydrocarbons;
    b. causing said mixture with said inhibitor to have an inhibitor concentration in the range of about 0.1% to about 15.5% of the total volume of said mixture with said inhibitor; and
    c. capturing said active intermediates by said inhibitor.

13. A method of regulating the intensity of the combustion of a mixture of hydrogen and air, said method comprising the steps of:

a. causing an inhibitor to be present in said mixture of hydrogen and air, said inhibitor consisting of at least one hydrocarbon wherein said hydrocarbon is a member selected from the group consisting of the hydrocarbons having a cyclical structure, including aromatic hydrocarbons;

b. causing said mixture with said inhibitor to have an inhibitor concentration of up to about 15.5% of the total volume of said mixture with said inhibitor; and c. capturing the active intermediates that serve as chain carriers in the oxidation of hydrogen by said inhibitor.

14. The method as set forth in claim 13 wherein said method includes the step of:

a. receiving and storing, transporting, compressing or liquefying said hydrogen.

15. The method as set forth in claim 13 wherein said method includes the step of:

a. using said hydrogen with said inhibitor as a lifting means.

16. The method as set forth in claim 13 wherein said method includes the step of:

a. using said hydrogen with said inhibitor as a cooling means.

17. The method as set forth in claim 13 wherein said method includes the step of:

a. using said inhibitor as a component in a production process in which hydrogen is formed.

18. The method as set forth in claim 14 wherein said method includes the step of:

a. using said inhibitor as a component in a production process in which hydrogen is present.

19. The method as set forth in claim 14 wherein said method includes the step of:

a. using said hydrogen with said inhibitor as a fuel means.

20. A method of regulating the intensity of the combustion of a mixture of hydrogen and air, said method comprising the steps of:

a. causing an inhibitor to be present in said mixture of hydrogen and air, said inhibitor consisting of at least one hydrocarbon having three to eight carbon atoms wherein said hydrocarbon is a member selected from the group consisting of the hydrocarbons having a cyclical structure, including aromatic hydrocarbons;

b. causing said mixture with said inhibitor to have an inhibitor concentration in the range of about 0.1% to about 15.5% of the total volume of said mixture with said inhibitor; and c. capturing the active intermediates that serve as chain carriers in the oxidation of hydrogen by said inhibitor.

* * * * *

UNITED STATES PATENT AND TRADEMARK OFFICE
CERTIFICATE OF CORRECTION

PATENT NO. : 6,099,294

DATED : August 8, 2000

INVENTOR(S) : Azatyan et al.

It is certified that error appears in the above-identified patent and that said Letters Patent is hereby corrected as shown below:

Column 2, Line 5, delete "duel-air" and insert therefor --fuel-air--.
Column 5, Line 63, delete "$C_3H_4$" and insert therefor --$C_3H_6$--.
Column 6, Line 21, delete "$C_2H_4$" and insert therefor --$C_2H_6$--.
Column 7, Table 1, under column 1, line 4, delete "48.0" and insert therefor --46.0--.
Column 7, Table 2, in the heading of the table, delete "$C_8H_{10}$" and insert therefor --$C_8H_{18}$ and delete "$C_2H_4$" and insert therefor --$C_3H_6$--.
Column 9, Table 3, in the heading of the table, delete "$C_2H_{14}$" and insert therefor --$C_2H_{16}$--.
Column 9, Table 4 and Table 4-continued in the heading of the table, delete "$C_3H_8$" and insert therefor --$C_3H_6$--, delete "$C_4H_4CH_3$" and insert therefor - -$C_6H_5CH_3$- -.

Signed and Sealed this

Twenty-fourth Day of April, 2001

Attest:

Attesting Officer

NICHOLAS P. GODICI

*Acting Director of the United States Patent and Trademark Office*